(12) United States Patent
Neuguth et al.

(10) Patent No.: US 7,594,791 B1
(45) Date of Patent: Sep. 29, 2009

(54) CONTAINER HANDLING SYSTEM

(76) Inventors: Christopher E. Neuguth, 7302 Isle Dr., Port Richey, FL (US) 34668;
Christopher J. Cannava, 500 - 110th Ave., North, #114, St. Petersburg, FL (US) 33716

( * ) Notice: Subject to any disclaimer, the term of this patent is extended or adjusted under 35 U.S.C. 154(b) by 693 days.

(21) Appl. No.: 11/398,091

(22) Filed: Apr. 5, 2006

Related U.S. Application Data

(60) Provisional application No. 60/668,542, filed on Apr. 5, 2005.

(51) Int. Cl.
*B62B 1/00* (2006.01)
(52) U.S. Cl. .................. 414/482; 414/458; 414/498
(58) Field of Classification Search ............. 414/482, 414/458, 498, 495
See application file for complete search history.

(56) References Cited

U.S. PATENT DOCUMENTS

| | | | | | |
|---|---|---|---|---|---|
| 3,933,218 | A | * | 1/1976 | Oler et al. | 180/411 |
| 4,452,555 | A | * | 6/1984 | Calabro | 410/53 |
| 4,968,096 | A | * | 11/1990 | Chattin | 298/6 |
| 5,800,114 | A | * | 9/1998 | Secondi | 414/458 |
| 6,071,062 | A | * | 6/2000 | Warhurst et al. | 414/498 |
| 2005/0226707 | A1 | * | 10/2005 | Quenzi et al. | 414/482 |

* cited by examiner

*Primary Examiner*—Khoa D Huynh
*Assistant Examiner*—Sumaia Alhadithi
(74) *Attorney, Agent, or Firm*—Larson & Larson, P.A.; Frank Liebenow

(57) ABSTRACT

A trailer body has a generally U-shaped lifting portion. A container lifting mechanism has a lifting hydraulic cylinder assembly and a lifting frame. Coupled to a lifting beam is an associated pulley. A lifting means is a hydraulic cylinder body. The trailer body has a pair of dual wheel spindle assemblies and a steering and drive assembly.

20 Claims, 5 Drawing Sheets

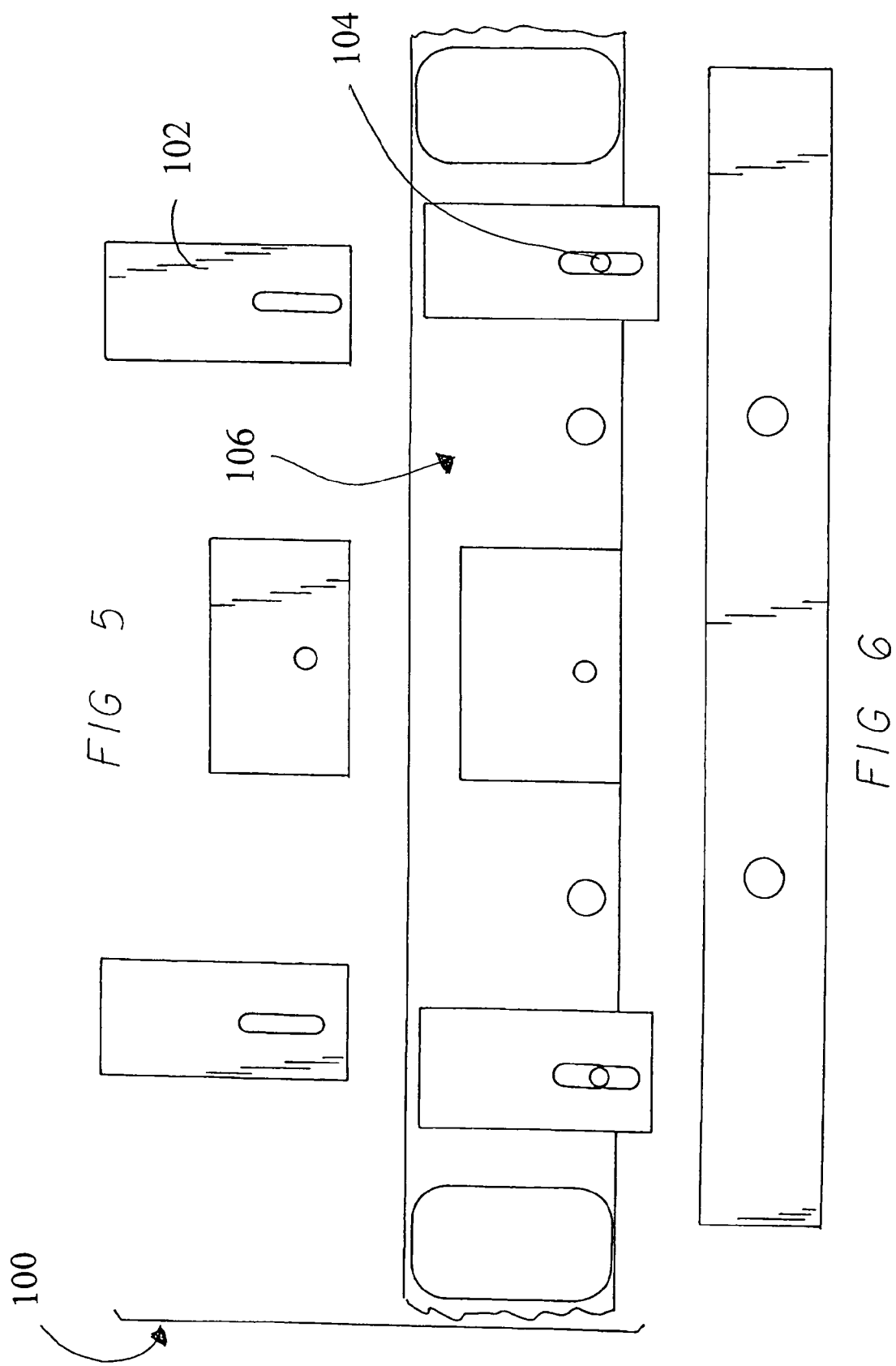

CONTAINER HANDLING SYSTEM

RELATED APPLICATION

The present invention is a non-provisional application based upon Provisional Application Ser. No. 60/668,542 filed Apr. 5, 2005. Applicants claim the priority and benefit of the above cited provisional application which is incorporated herein by reference.

BACKGROUND OF THE INVENTION

1. Field of the Invention

The present invention relates to a container handling system and more particularly pertains to a device for handling containers.

2. Description of the Prior Art

The use of container handling devices is known in the prior art. More specifically, container handling devices previously devised and utilized for the purpose of moving and handling containers are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 3,933,218 issued Jan. 20, 1976, to Oler, et al. discloses a container handling truck. U.S. Pat. No. 6,071,062 issued Jun. 6, 2000, to Warhurst et al. discloses a apparatus for lifting handling and transporting a container. Lastly, U.S. Pat. No. 5,800,114 issued Sep. 1, 1998, to Secondi discloses a container handling device.

While these devices fulfill their respective, particular objectives and requirements, the aforementioned patents do not describe a container handling system that allows for lifting and moving containers as in the present invention.

In this respect, the container handling system according to the present invention substantially departs from the conventional concepts and designs of the prior art, and in doing so provides an apparatus primarily developed for the purpose of lifting and moving containers.

Therefore, it can be appreciated that there exists a continuing need for a new and improved container handling system which can be used for lifting and moving containers. In this regard, the present invention substantially fulfills this need.

SUMMARY OF THE INVENTION

In view of the foregoing disadvantages inherent in the known types of container handling devices now present in the prior art, the present invention provides an improved container handling system. As such, the general purpose of the present invention, which will be described subsequently in greater detail, is to provide a new and improved container handling system and method which has all the advantages of the prior art and none of the disadvantages.

To attain this, the present invention essentially comprises a trailer lift system for allowing a user to lift and move containers. The system comprises several components, in combination.

First provided is a trailer body. The trailer body has a neck portion and a lifting portion. The neck portion has a forward end and a rearward end. The forward end of the neck portion has a fifth wheel attachment coupled thereto. The rearward end of the neck portion has a lifting portion attachment with there being a length between the forward and rearward ends of the neck portion. Within the length between the fifth wheel attachment and the lifting portion attachment there is located at least one control panel and at least one hydraulic power source, as well as at least one hydraulic valve and at least one hydraulic pressure line.

The lifting portion of the trailer body has a forward end and a rearward end. The lifting portion of the trailer body when viewed from above has a generally U-shaped configuration running from front to back. The lifting portion of the trailer body has a pair of upper longitudinal supports and a pair of lower longitudinal supports. The upper and lower longitudinal supports are coupled to the forward end of the lifting portion. The rear of the lifting portion is open and the front of the lifting portion is closed. The open rear of the lifting portion allows the trailer body to be positioned on three sides of an object to be lifted.

Next provided is a container lifting mechanism. The container lifting mechanism comprises a lifting hydraulic cylinder assembly and a lifting frame. The lifting hydraulic cylinder assembly has at least one hydraulic cylinder with each cylinder having a ram and a body. The container lifting mechanism has a plurality of pulleys, and at least one cable, with the cable having a length with a first end and a second end. The first end of the cable is coupled to the ram of the lifting hydraulic cylinder and the second end of the cable is coupled to the lifting frame.

The lifting frame comprises at least one lifting beam, preferably a pair of lifting beams. The pair of lifting beams is positioned to be parallel with the longitudinal supports. Each lifting beam has at least one associated pulley, and preferably two pulleys coupled thereto. The pulleys are located near the ends of the lifting beam and the cable contacts the pulleys, allowing the pulling of the cable to effectuate the raising of the lifting beam. The cable runs across at least one pulley. Each lifting beam has a plurality of coupling points where a coupling means, such as a chain, cable, wire, rope, or strap can be coupled thereto.

The hydraulic cylinder body is coupled to the trailer body. The hydraulic ram, being coupled to the cable, pulls the cable when the ram is drawn into the cylinder. The pulling of the cable causes the raising of the lifting beams.

Next provided is a pair of dual wheel spindle assemblies. Each wheel spindle assembly has a mounting plate and a spindle coupled thereto. Each wheel spindle assembly has a pair of suspension subassemblies associated therewith. In the preferred embodiment air bag suspension subassemblies are utilized to provide cushion for the trailer during transport. The configuration of the spindle assemblies allows the lifting trailer to have an open U-shaped configuration, without having axles running across the width of the trailer.

Lastly provided is a steering and drive assembly. The steering and drive assembly is coupled to the forward end of the lifting portion of the trailer body. The steering and drive assembly comprises a frame and a mounting plate and a downwardly positioned hydraulic cylinder having a ram and a body. The frame is coupled to the front end of the lifting portion of the trailer body at a distance equidistant from either side of the lifting portion. In that way, the steering and drive assembly lies in the longitudinal midline of the trailer. The mounting plate is slidably coupled to the frame. The ram is coupled to the plate and the cylinder body is coupled to the forward end of the lifting portion. The steering and drive assembly also has a drive wheel coupled to the plate. The drive wheel has a hydraulically powered drive motor associated therewith. The drive motor is coupled to the hydraulic power source of the trailer body thereby enabling the drive wheel to rotate and turn. The drive wheel allows the movement of the trailer lift system across a surface independent of the fifth wheel attachment and the towing vehicle.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved container handling system which has all of the advantages of the prior art container handling devices and none of the disadvantages.

It is another object of the present invention to provide a new and improved container handling system which may be easily and efficiently manufactured and marketed.

It is further object of the present invention to provide a new and improved container handling system which is of durable and reliable constructions.

An even further object of the present invention is to provide a new and improved container handling system which is susceptible of a low cost of manufacture with regard to both materials and labor.

Even still another object of the present invention is to provide a container handling system for lifting and moving containers.

Lastly, it is an object of the present invention to provide a new and improved trailer lift system comprising a trailer body having a lifting portion having a generally U-shaped configuration. A container lifting mechanism comprises a lifting hydraulic cylinder assembly and a lifting frame. There is a lifting beam with an associated pulley coupled thereto. A hydraulic cylinder body provides a lifting means. The trailer has a pair of dual wheel spindle assemblies and a steering and drive assembly.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a side elevation of the spindle mounting plates.

FIG. 6 is a side elevation of the spindle mounting subassembly.

The same reference numerals refer to the same parts throughout the various Figures.

DESCRIPTION OF THE PREFERRED EMBODIMENT

Figure 1:
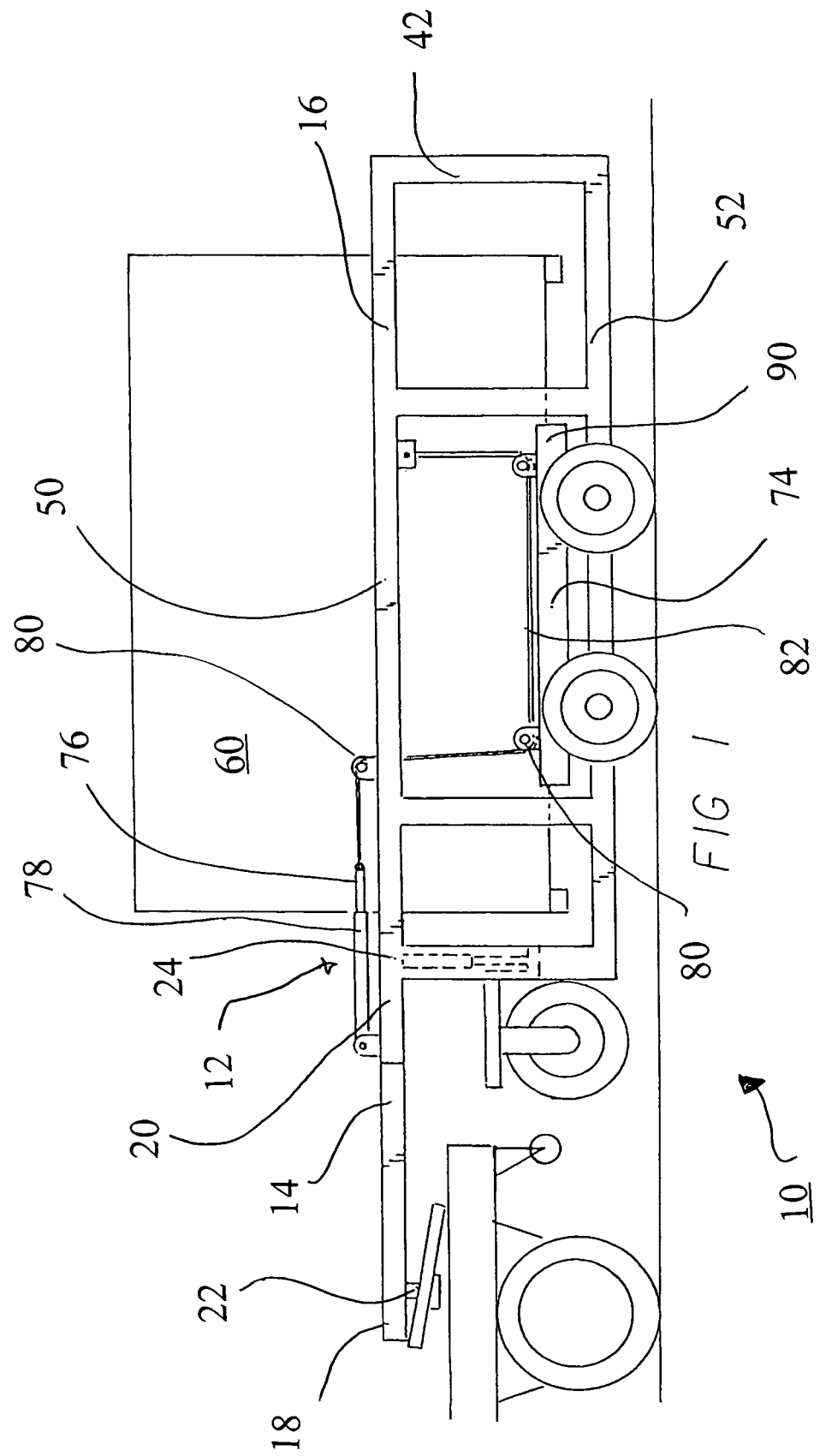
FIG. 1 is a side elevation of the system.
Figure 2:
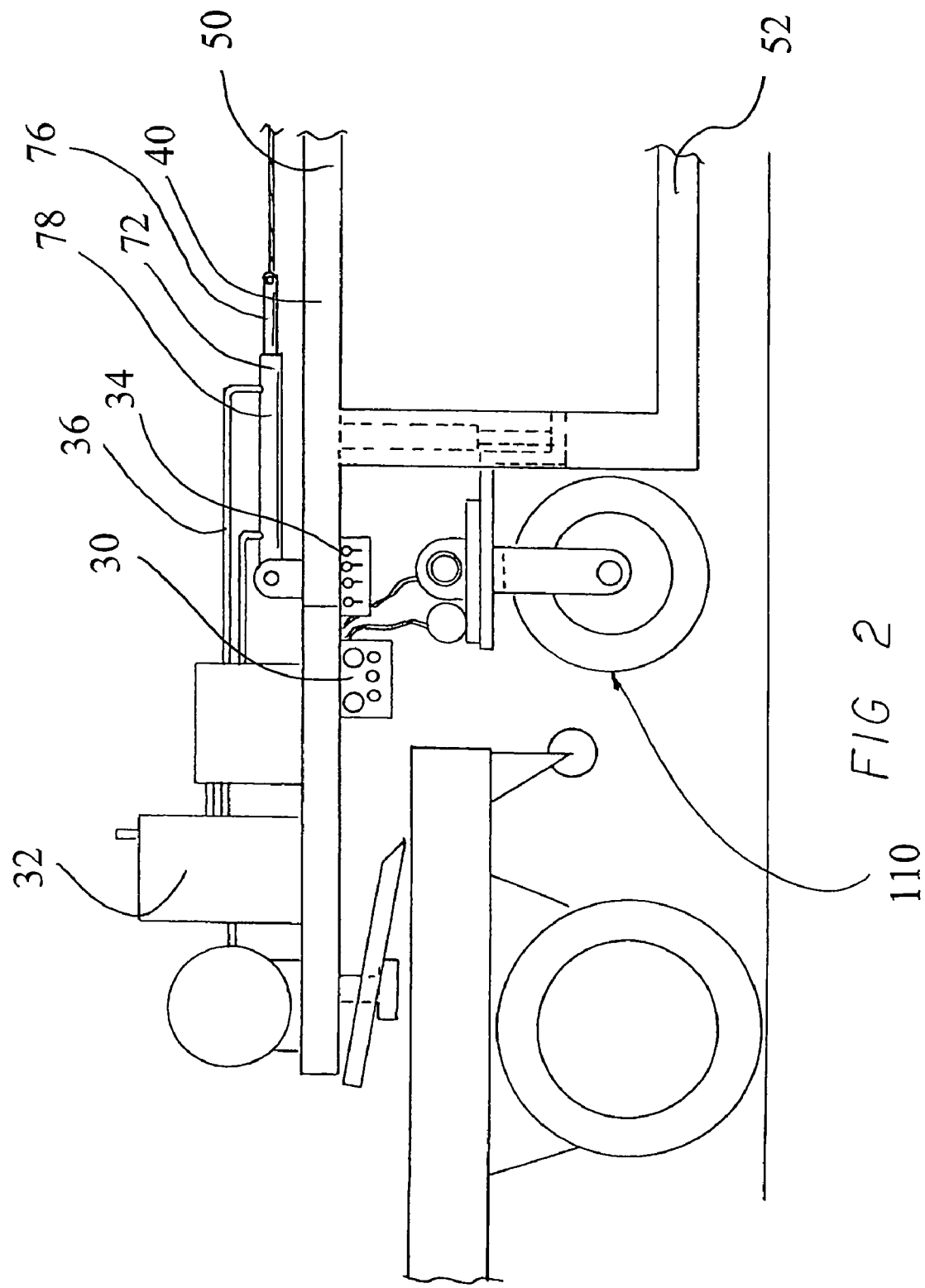
FIG. 2 is a close up side elevation view of the forward portion of the system, as it is connected to a fifth wheel of a truck.
Figure 3:
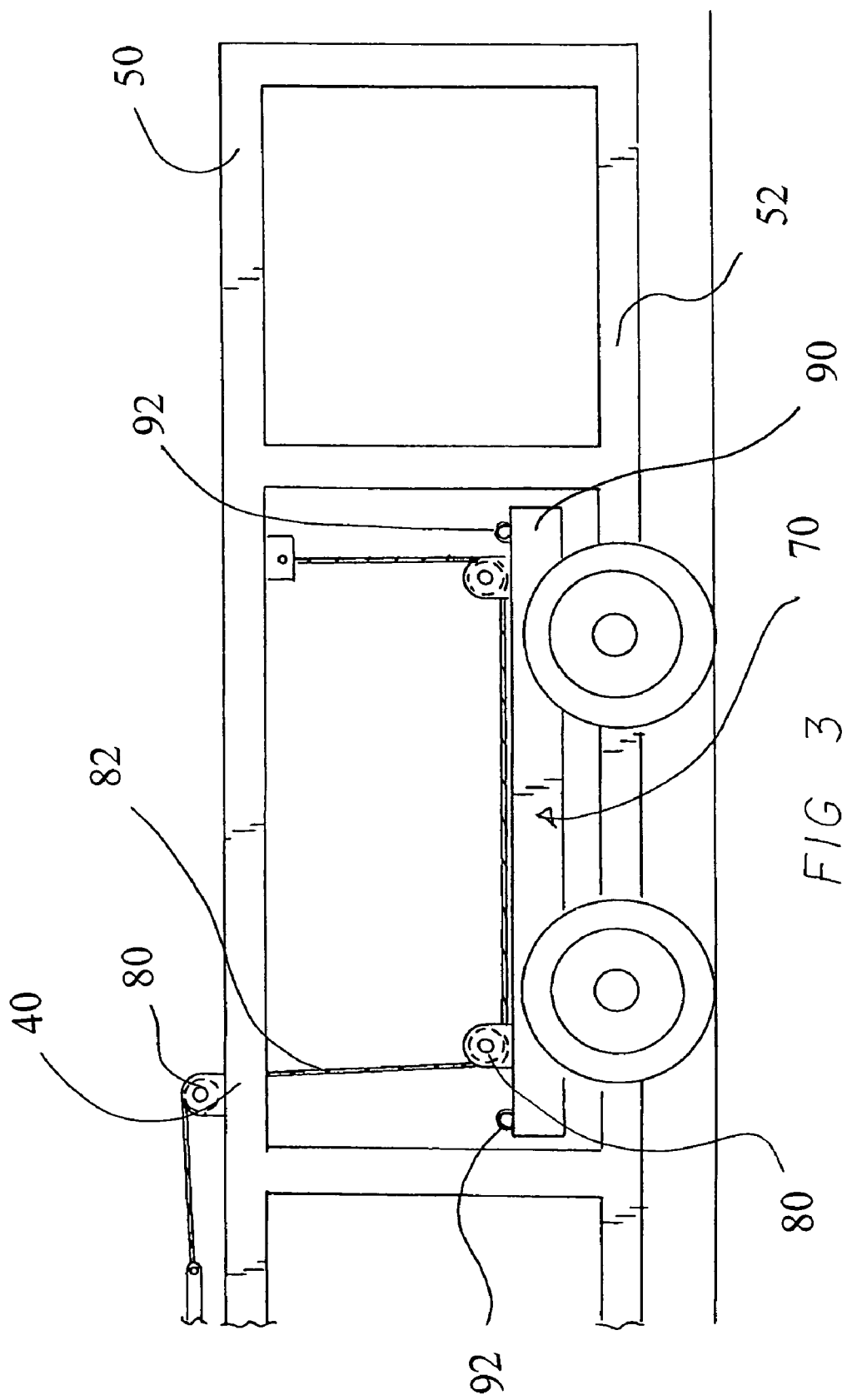
FIG. 3 is side elevation of the system demonstrating the lifting mechanism.
Figure 4:
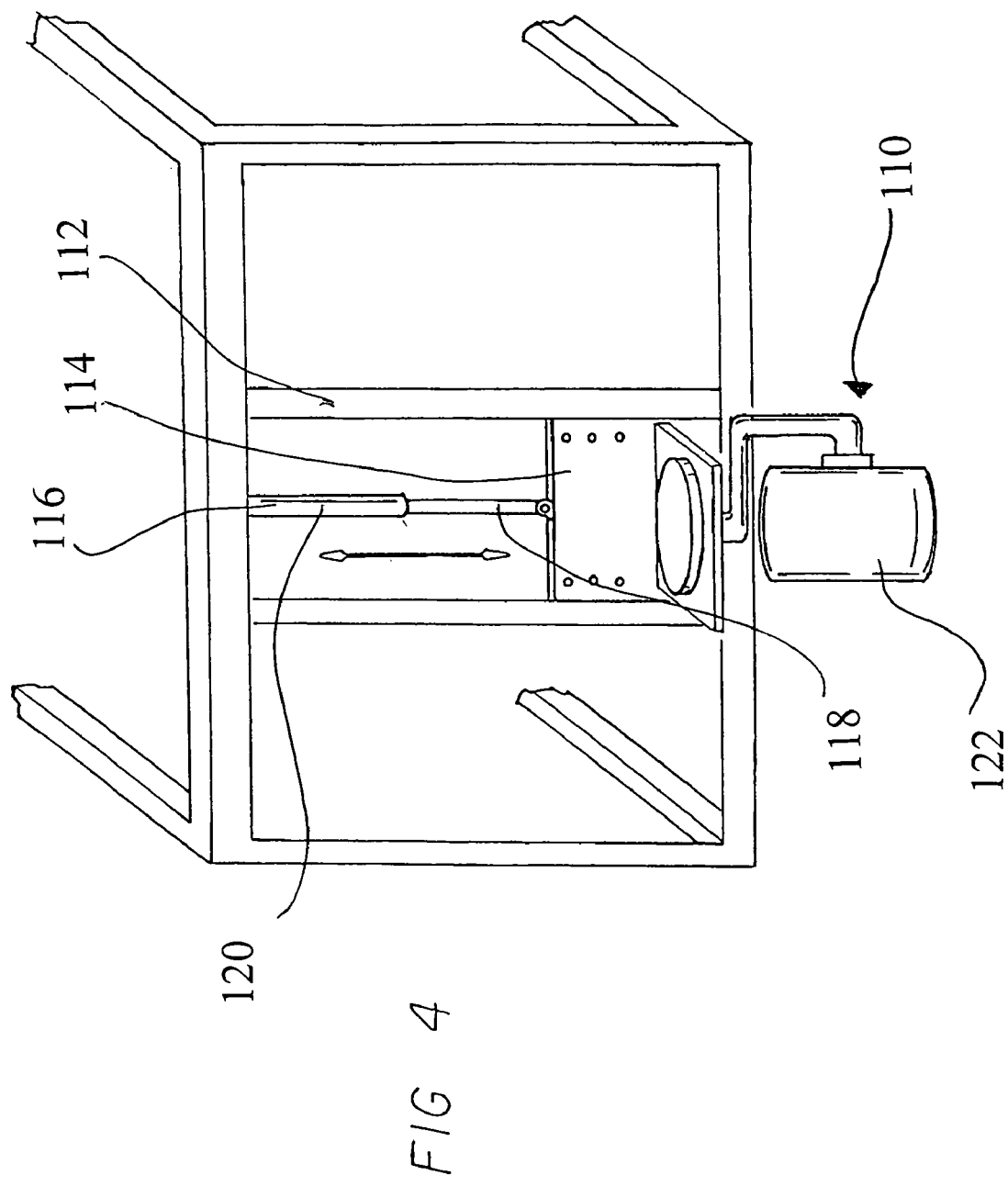
FIG. 4 is a side elevation of the front of the system, showing the drive wheel being movable in an upward and downward direction.

With reference now to the drawings, and in particular to FIG. 1 thereof, the preferred embodiment of the new and improved container handling system embodying the principles and concepts of the present invention and generally designated by the reference numeral 10 will be described.

The present invention, the container handling system 10 is comprised of a plurality of components. Such components in their broadest context include a frame, a pair of wheel spindles, a lifting means and a means to move the system about. Such components are individually configured and correlated with respect to each other so as to attain the desired objective.

A trailer lift system 10 for allowing a user to lift and move containers is disclosed. The system comprises several components, in combination.

First provided is a trailer body 12. The trailer body has a neck portion 14 and a lifting portion 16. The neck portion has a forward end 18 and a rearward end 20. The forward end of the neck portion has a fifth wheel attachment and an associated king pin 22 coupled thereto. The rearward end of the neck portion has a lifting portion attachment 24 with there being a length between the forward and rearward ends of the neck portion. Within the length between the fifth wheel attachment and the lifting portion attachment there is located at least one control panel 30 and at least one hydraulic power source 32, as well as at least one hydraulic valve 34 and at least one hydraulic pressure line 36.

The lifting portion of the trailer body has a forward end 40 and a rearward end 42. The lifting portion of the trailer body when viewed from above has a generally U-shaped configuration running from front to back. The lifting portion of the trailer body has a pair of upper longitudinal supports 50 and a pair of lower longitudinal supports 52. The upper and lower longitudinal supports are coupled to the forward end of the lifting portion. The rear of the lifting portion is open and the front of the lifting portion is closed. The open rear of the lifting portion allows the trailer body to be positioned on three sides of an object 60 to be lifted.

Next provided is a container lifting mechanism 70. The container lifting mechanism comprises a lifting hydraulic cylinder 72 assembly and a lifting frame 74. The lifting hydraulic cylinder assembly has at least one hydraulic cylinder with each cylinder having a ram 76 and a body 78. The container lifting mechanism has a plurality of pulleys 80, and at least one cable 82, with the cable having a length with a first end and a second end. The first end of the cable is coupled to the ram of the lifting hydraulic cylinder and the second end of the cable is coupled to the lifting frame.

The lifting frame comprises at least one lifting beam 90, preferably a pair of lifting beams. The pair of lifting beams is positioned to be parallel with the longitudinal supports. Each lifting beam has at least one associated pulley, and preferably two pulleys coupled thereto. The pulleys are located near the ends of the lifting beam and the cable contacts the pulleys, allowing the pulling of the cable to effectuate the raising of the lifting beam. The cable runs across at least one pulley. Each lifting beam has a plurality of coupling points 92 where a coupling means, such as a chain, cable, wire, rope, or strap can be coupled thereto.

The hydraulic cylinder body is coupled to the trailer body. The hydraulic ram, being coupled to the cable, pulls the cable when the ram is drawn into the cylinder. The pulling of the cable causes the raising of the lifting beams.

In an alternate embodiment there may be more than one lifting mechanism employed. Each lifting mechanism may work alone and be individually controlled, or it may be simultaneously controlled to provide for an even lift of the lifting mechanism. Such lifting means or mechanisms may include electric motors, hydraulic motors, mechanical devices such as gears or shafts, or any combination of the above.

Next provided is a pair of dual wheel spindle assemblies 100. Each wheel spindle assembly has a mounting plate 102 and a spindle 104 coupled thereto. Each wheel spindle assembly has a pair of suspension subassemblies 106 associated therewith. In the preferred embodiment air bag suspension subassemblies (not shown) are utilized to provide cushion for the trailer during transport. The configuration of the spindle assemblies allows the lifting trailer to have an open U-shaped configuration, without having axles running across the width of the trailer.

Of course, one skilled in the art would realize that a trailer having only one set of wheels is anticipated within this description. One would also recognize that such a configuration would limit the size and weight that the trailer system could carry.

Lastly provided is a steering and drive assembly 110. The steering and drive assembly is coupled to the forward end of the lifting portion of the trailer body. The steering and drive assembly comprises a frame 112 and a mounting plate 114 and a downwardly positioned hydraulic cylinder 116 having a ram 118 and a body 120. The frame is coupled to the front end of the lifting portion of the trailer body at a distance equidistant from either side of the lifting portion. In that way, the steering and drive assembly lies in the longitudinal midline of the trailer. The mounting plate is slidably coupled to the frame. The ram is coupled to the plate and the cylinder body is coupled to the forward end of the lifting portion. The steering and drive assembly also has a drive wheel 122 coupled to the plate. The drive wheel has a hydraulically powered drive motor associated therewith. The drive motor is coupled to the hydraulic power source of the trailer body thereby enabling the drive wheel to rotate and turn. The drive wheel allows the movement of the trailer lift system across a surface independent of the fifth wheel attachment and the towing vehicle.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A trailer system for lifting and transporting storage containers, the trailer system comprising:
    a rectangular frame having a left side, a right side, a front side and an open back such that the frame is U-shaped when viewed from above;
    at least one wheel rotatably coupled to the left side;
    at least one wheel rotatably coupled to the right side;
    a lifting portion comprising a left upper longitudinal support parallel and in line with the left side and a right upper longitudinal support parallel and in line with the right side;
    a lifting frame comprising a left lifting beam and a right lifting beam;
    a left hydraulic cylinder having a left hydraulic ram and a right hydraulic cylinder having a right hydraulic ram, the left and right hydraulic cylinders affixed to the rectangular frame;
    at least one left cable affixed at one end to the left hydraulic ram, the at least one left cable interfaced with the left lifting beam and a distal end of the at least one left cable attached to the left upper longitudinal support; and
    at least one right cable affixed at one end to the right hydraulic ram, the at least one right cable interfaced with the right lifting beam and a distal end of the right cable attached to the right upper longitudinal support.

2. The trailer system for lifting and transporting storage containers of claim 1 further comprising a plurality of pulleys for guiding the left and right cables.

3. The trailer system for lifting and transporting storage containers of claim 1 further comprising a neck portion affixed to the rectangular frame for removably attaching to a vehicle.

4. The trailer system for lifting and transporting storage containers of claim 3 further comprising a fifth wheel coupled to the neck portion.

5. The trailer system for lifting and transporting storage containers of claim 1, the left lifting beam and the right lifting beam further comprising a plurality of coupling points and straps, ends of the straps attached to the coupling points and the straps passing under the storage container whereby lifting of the left lifting beam and the right lifting beam by the left and right cylinder rams results in lifting of the chains, thereby lifting the storage container.

6. The trailer system for lifting and transporting storage containers of claim 1, the left lifting beam and the right lifting beam further comprising a plurality of coupling points and chains, ends of the chains attached to the coupling points and the chains passing under the storage container whereby lifting of the left lifting beam and the right lifting beam by the straps, thereby lifting the storage container.

7. The trailer system for lifting and transporting storage containers of claim 1, further comprising a hydraulic power source mounted on the trailer.

8. The trailer system for lifting and transporting storage containers of claim 7, wherein hydraulic power source is powered by a fuel selected from the group consisting of propane, gasoline and diesel.

9. A trailer system for lifting and transporting storage containers, the trailer system comprising:
- a frame having a left side, a right side, a front side and an open back such that the frame is U-shaped when viewed from above allowing for the storage container to fit between the left side and the right side;
- at least one wheel rotatably coupled to the left side;
- at least one wheel rotatably coupled to the right side;
- a lifting portion comprising a left upper longitudinal support parallel and in line with the left side and a right upper longitudinal support parallel and in line with the right side;
- a lifting frame comprising a left lifting beam and a right lifting beam;
- a means for lifting the left lifting beam affixed to the left side of the trailer;
- a means for lifting the right lifting beam affixed to the right side of the trailer;
- at least one left frame pulley rotatably affixed to the left upper longitudinal support;
- at least one right frame pulley rotatably affixed to the right upper longitudinal support;
- at least one left cable affixed at one end to the means for lifting the left lifting beam, the left cable passing around the at least one left frame pulley and a distal end of the left cable attached to the left upper longitudinal support; and
- a right cable affixed at one end to the means for lifting the right longitudinal lifting beam, the right cable passing around the at least one right frame pulley and a distal end of the right cable attached to the right upper longitudinal support.

10. The trailer system for lifting and transporting storage containers of claim 9, further comprising a neck portion affixed to the rectangular frame for removably attaching to a vehicle.

11. The trailer system for lifting and transporting storage containers of claim 10, further comprising a fifth wheel coupled to the neck portion.

12. The trailer system for lifting and transporting storage containers of claim 9, the left lifting beam and the right lifting beam further comprising a plurality of coupling points and straps, ends of the straps attached to the coupling points and the straps passing under the storage container whereby lifting of the left lifting beam and the right lifting beam by the left and right cylinder rams results in lifting of the straps, thereby lifting the storage container.

13. The trailer system for lifting and transporting storage containers of claim 9, the left lifting beam and the right lifting beam further comprising a plurality of coupling points and chains, ends of the chains attached to the coupling points and the chains passing under the storage container whereby lifting of the left lifting beam and the right lifting beam by the left and right cylinder rams results in lifting of the chains, thereby lifting the storage container.

14. The trailer system for lifting and transporting storage containers of claim 9, further comprising a hydraulic power source mounted on the trailer.

15. The trailer system for lifting and transporting storage containers of claim 14, wherein hydraulic power source is powered by a fuel selected from the group consisting of propane, gasoline and diesel.

16. A trailer system for lifting and transporting storage containers, the trailer system comprising:
- a frame having a left side, a right side, a front side and an open back such that the frame is U-shaped when viewed from above allowing for the storage container to fit between the left side and the right side;
- a first wheel rotatably coupled to the left side;
- a second wheel rotatably coupled to the right side;
- a lifting portion comprising a left side of the frame, parallel and in line with the left side and a right lifting beam parallel and in line with the right side;
- a lifting frame comprising a left lifting beam and a right side of the frame;
- a left hydraulic cylinder affixed to the left side of the trailer, the left hydraulic cylinder having a left hydraulic ram;
- a right hydraulic cylinder affixed to the right side of the trailer, the right hydraulic cylinder having a right hydraulic ram;
- a left frame pulley rotatably affixed to the a left side of the frame;
- a right frame pulley rotatably affixed to the a right side of the frame;
- two left beam pulleys rotatably affixed to distal top surfaces of the left lifting beam;
- two right beam pulleys rotatably affixed to distal top surfaces of the right lifting beam;
- a left cable affixed at one end to the left hydraulic ram, passing over the left frame pulleys, passing under a first of the two left beam pulleys, passing under a second of the two left beam pulleys and a distal end of the left cable attached to the left lifting beam; and
- a right cable affixed at one end to the right hydraulic ram, passing over the right frame pulleys, passing under a first of the two right beam pulleys, passing under a second of the two left beam pulleys and a distal end of the right cable attached to the right lifting beam.

17. The trailer system for lifting and transporting storage containers of claim 16 further comprising a neck portion affixed to the rectangular frame for removably attaching to a vehicle.

18. The trailer system for lifting and transporting storage containers of claim 17 further comprising a fifth wheel coupled to the neck portion.

19. The trailer system for lifting and transporting storage containers of claim 16, the left lifting beam and the right lifting beam further comprising a plurality of coupling points and straps, a first end of each strap attached to a coupling point of the left lifting beam and a second end of each strap attached to a coupling point of the right lifting beam and the straps passing under the storage container whereby lifting of the left lifting beam and the right lifting beam by the left and right cylinder rams results in lifting of the straps, thereby lifting the storage container.

20. The trailer system for lifting and transporting storage containers of claim 16, the left lifting beam and the right lifting beam further comprising a plurality of coupling points and chains, a first end of each chain attached to a coupling point of the left lifting beam and a second end of each chain attached to a coupling point of the right lifting beam and the chains passing under the storage container whereby lifting of the left lifting beam and the right lifting beam by the left and right cylinder rams results in lifting of the chains, thereby lifting the storage container.

* * * * *